United States Patent [19]

Olenzek et al.

[11] 3,903,847
[45] Sept. 9, 1975

[54] ROTARY COMBUSTION ENGINE

[75] Inventors: Richard T. Olenzek; Herman H. Petrak, both of Livonia; Carl S. Hoffman, Birmingham; Paul J. Louzecky, Troy, all of Mich.

[73] Assignee: General Motors Corporation, Detroit, Mich.

[22] Filed: Aug. 16, 1974

[21] Appl. No.: 497,870

[52] U.S. Cl. .................. 123/8.07; 74/411; 418/60
[51] Int. Cl.² .................. F02B 53/00; F16H 55/14
[58] Field of Search ........ 74/411; 123/8.07; 418/60, 418/212; 308/22, 23

[56] References Cited
UNITED STATES PATENTS

| | | | |
|---|---|---|---|
| 3,096,746 | 7/1963 | Sollinger | 123/8.07 |
| 3,259,115 | 7/1966 | Bensinger et al. | 418/212 X |
| 3,301,229 | 1/1967 | Braun et al. | 123/8.45 |

*Primary Examiner*—C. J. Husar
*Assistant Examiner*—Michael Koczo, Jr.
*Attorney, Agent, or Firm*—Ronald L. Phillips

[57] ABSTRACT

A rotary combustion engine having a split carrier with or without an integral stationary phasing gear wherein the carrier halves with bearing halves mounted thereon are bolted together about an intermediate main journal on the crankshaft and the assembly is then insertable in an opening in an intermediate wall in the engine housing. The assembled carrier is held against the wall of this opening to receive the combustion gas pressure force by spring loaded dowels that permit slight angular movement of the split carrier to dampen gear tooth shock or carrier motion.

6 Claims, 7 Drawing Figures

ROTARY COMBUSTION ENGINE

This invention relates to a rotary combustion engine and more particularly a rotary combustion engine having a split stationary phasing gear and main journal bearing.

In rotary combustion engines having two or more rotors supported on eccentrics on the crankshaft, it is difficult to provide a main journal bearing support and/or a stationary phasing gear between adjacent crankshaft eccentrics since neither the bearing nor the stationary phasing gear can normally fit over the eccentrics. Like in reciprocating piston engines employing anti-friction bearings at the crankshaft's main and/or connecting rod journals, there are generally two choices; namely, employing a multi-piece (built-up) crankshaft or splitting the bearing assemblies. While this choice is also possible in rotary combustion engines, the added difficulty in also providing phasing gear tooth alignment in a split arrangement has led some engine builders to favoring the built-up crankshaft even though the former may present substantial advantages over the latter in a given situation.

This difficulty is overcome by the present invention with a split carrier having an integral stationary phasing gear wherein these parts are machined in a bolted together assembled condition and then bearing halves are mounted in the carrier halves and the carrier halves are at final assembly bolted together with their bearings about an intermediate main journal on the crankshaft with the phasing gear machined on the carrier. Slight reliefs are provided on one of the carrier halves at its split line and directly back of the gear teeth to assure proper clamping pressure on the split line gear tooth area in order to obtain the correct spacing of the gear teeth at this joint to prevent the excessive gear tooth loading that can result from a slightly separated joint. In addition, the bearing halves are arranged so as not to extend the full width of the gear joint so that when they are clamped with a crush fit to obtain bearing concentricity, they do not cause gear tooth separation. This bearing setback also reduces the magnitude of the main journal bearing force acting in the gear area. With the carrier and bearing assembly bolted together about the intermediate main journal, it is then insertable in a cylindrical opening in an intermediate wall of the engine housing through which the eccentrics can pass, the carrier having an outer configuration such that it can be inserted in threaded manner into this opening while still retaining a substantial cylindrical surface area. The carrier is then positioned and held in place by a pair of dowels which at their outer ends are engaged by a flexible beam and at their inner ends engage the carrier so as to hold the cylindrical surface thereof in position against the wall of the opening to receive the combustion gas pressure force while permitting slight angular movement of the carrier and thus the integral stationary phasing gear to damp gear tooth shock loading. The split carrier may also be provided without the phasing gear in which case the spring loaded dowels continue to serve as holders and dampen any carrier motion caused by friction in the bearing.

An object of the present invention is to provide a new and improved rotary combustion engine.

Another object is to provide in a rotary combustion engine a split stationary phasing gear and bearing which are secured together about a main journal on the crankshaft and are then positioned and held in an accommodating portion of the engine housing to receive the combustion gas pressure force by spring loaded dowels which permit slight angular movement of the stationary phasing gear to damp gear shock.

Another object is to provide in a rotary combustion engine a split carrier with a split bearing and with or without an integral phasing gear wherein the carrier halves are bolted together about an intermediate main journal on the crankshaft with the split carrier providing a crush fit on the bearing and the bearing having provisions for assuring a tight gear tooth split line fit where there is the integral phasing gear and the assembly being mountable in an opening through which a crankshaft eccentric can pass and then positioned and held in place against a portion of the wall of the opening to receive the combustion gas pressure force by a pair of spring loaded dowels that also permit slight angular movement of the stationary phasing gear to damp gear tooth shock where there is the integral phasing gear and dampen any carrier motion caused by friction in the bearing when there is no integral gear.

These and other objects of the present invention will be more apparent from the following description and drawing in which.

Figure 1:
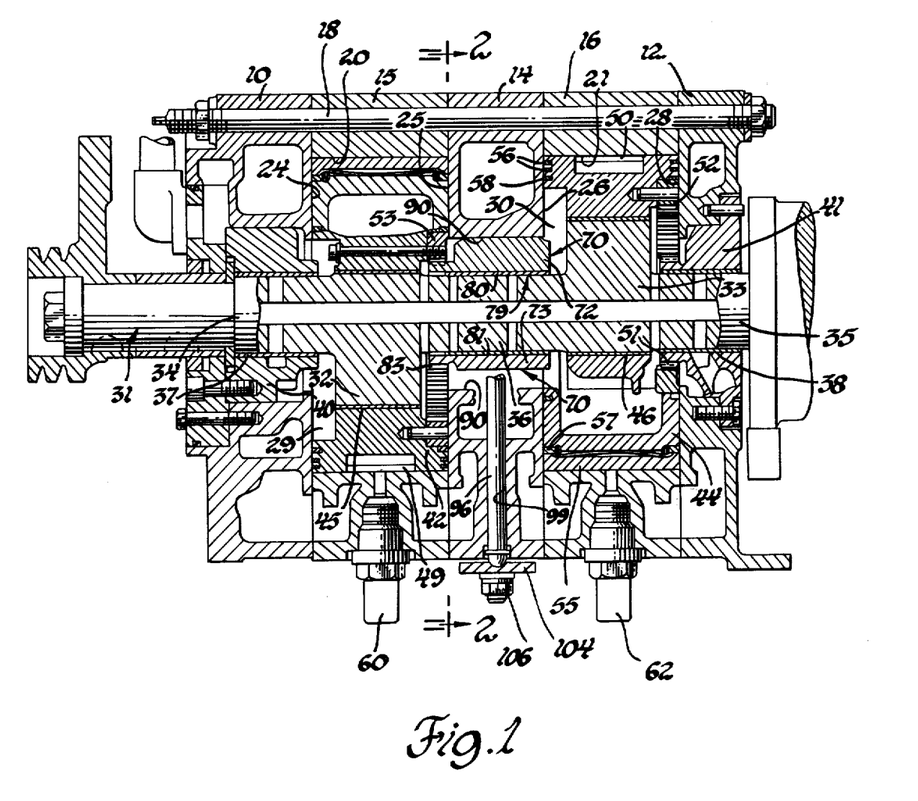
FIG. 1 is a longitudinal view with parts in section of a rotary combustion engine with a split carrier, stationary phasing gear and bearing arrangement according to the present invention.
Figures 2, 3, 4, 5:
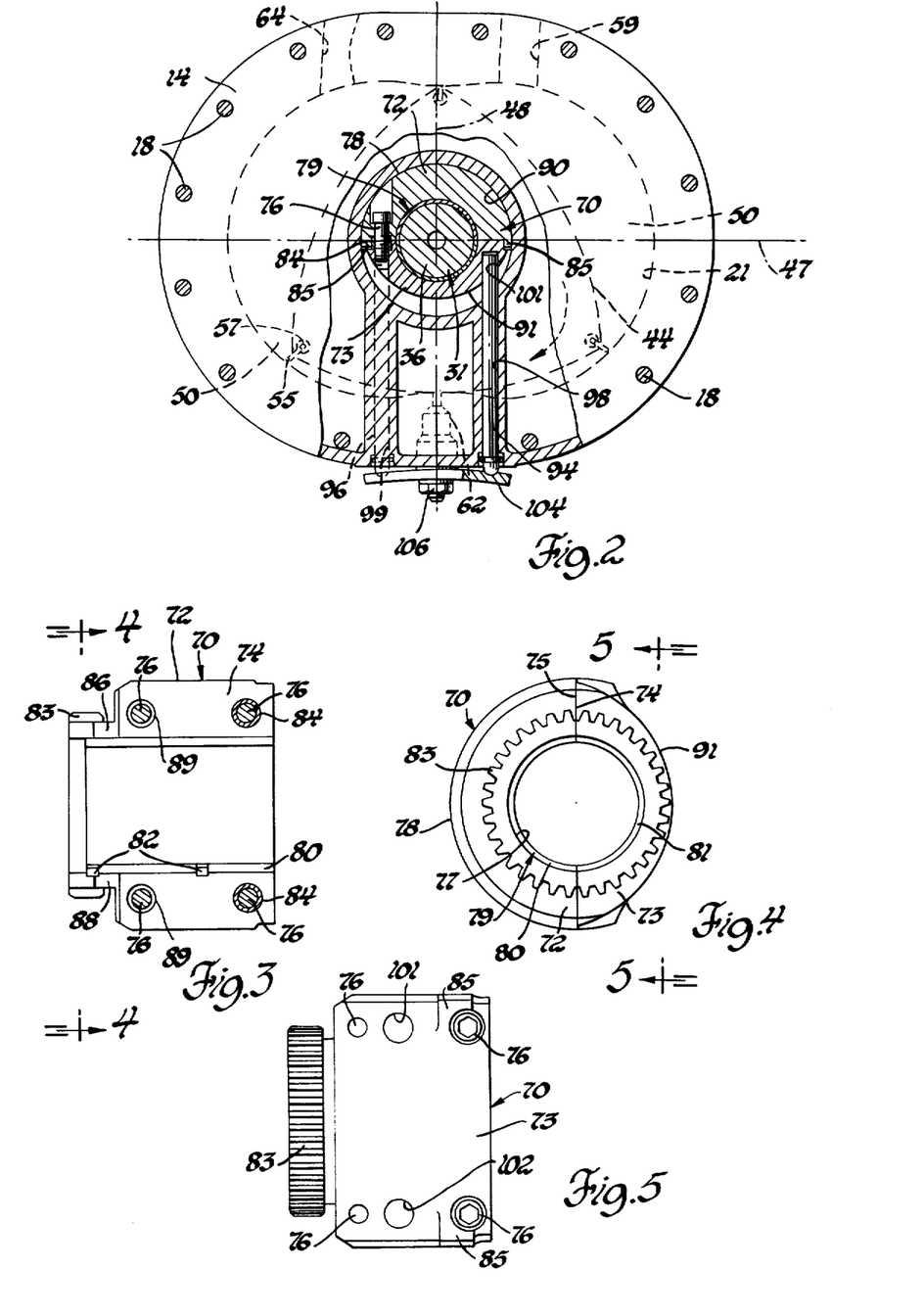
FIG. 2 is a view taken along the line 2—2 in FIG. 1.
FIG. 3 is an enlarged view of the assembled carrier, stationary phasing gear and bearing taken along their split line.
FIG. 4 is a view taken on the line 4—4 in FIG. 3.
FIG. 5 is a view taken along the line 5—5 in FIG. 4.

Referring first to FIGS. 1 and 2, the invention is shown in use in a rotary combustion engine of the compression ignition type. The engine comprises a pair of end housings 10 and 12, an intermediate housing 14 and a pair of rotor housings 15 and 16, all clamped together by bolts 18. The rotor housings 15 and 16 are located between the respective end housings 10 and 12 and the intermediate housing 14 and have internal peripheral walls 20 and 21 which cooperate with the oppositely facing housing walls 24 and 25 and 26 and 28 to provide a pair of cavities 29 and 30. A one-piece crankshaft 31 having eccentrics 32 and 33 located in the respective cavities 29 and 30 is rotatably supported in the engine housing at main journals 34 and 35 located near the outboard ends of the crankshaft in the end housings and also by a third main journal 36 located between the two eccentrics in the intermediate housing 14. The outboard main journals 34 and 35 are supported in bearing shells 37 and 38 which are mounted in collars 40 and 41 that are secured to the respective end housings 10 and 12 as shown in FIG. 1, the details of the support for the intermediate main journal 36 being described later.

Rotors 42 and 44 with bearing shells 45 and 46 are mounted on the respective eccentrics 32 and 33 for rotation about these eccentrics' center lines which are spaced 180° apart. As best shown in FIG. 2, the rotor housings' peripheral walls 20 and 21 have the shape of a two-lobe epitrochoid or a curve parallel thereto with a common major axis 47 and a common minor axis 48 and the rotors have three lobes which cooperate with the peripheral wall and the housing end walls to define three variable volume working chambers 49 and 50 about the respective rotors 42 and 44 that move therewith while expanding and contracting in fixed phase relation to the stationary engine body when the rotors are forced to rotate at one-third the speed of the crankshaft in a certain manner. In the case of rotor 44, an external tooth annular stationary phasing gear 51 is formed on the inboard end of collar 41 and meshes with an internal tooth annular rotary phasing gear 52 that is pinned or bolted to the outboard side of rotor 44 and is concentric therewith. The rotary phasing gear 52 has one and one-half times the number of teeth as the stationary phasing gear 51 to provide the required 3:1 speed ratio between the crankshaft and this rotor. There is also provided gearing between the other rotor 42 and the stationary engine body providing the required speed ratio between this rotor and the crank-shaft and the proper phased relation with the housing, this gearing arrangement including a rotary phasing gear 53 that is bolted as shown to the inboard side of the rotor 42 and meshes with a stationary phasing gear 83 whose structure will be described in detail later.

The adjacent working chambers around each rotor are sealed from each other as designated by number reference to only the sealing of chambers 50 by spring-biased apex seals 55 that are mounted in the rotor apexes and extend the width thereof and slide along the peripheral wall, pairs of spring-biased arcuate side seals 56 that are mounted in the rotor sides and extend along the rotor faces and slide on the opposite housing end wall and spring-biased corner seals 57 which are mounted in the rotor sides near the apexes and each provide while sliding on the opposite housing end wall a sealing link between the ends of adjacent side seals and one end of the adjacent apex seal. In addition, there is provided a spring-biased circular oil seal 58 mounted in each rotor side that engages the opposite end wall radially inward of the side seals to prevent the oil used for lubrication in the engine from reaching outward to the working chambers.

Air is admitted into each bank of working chambers, as shown in FIG. 2 for the chambers 50, by an intake port 59 in the respective rotor housing 16 that extends through the peripheral wall 21 and is thus traversed by the passing apex seals as the rotors rotate in the direction indicated by the arrow. Fuel is injected into the compressed air at the proper time by fuel injectors 60 and 62 which are mounted on the rotor housings 15 and 16 and the compression is sufficient to cause spontaneous combustion whereupon these chambers expand during a power phase. Thereafter, the spent gases are exhausted through an exhaust port 64 in the respective rotor housing that extends through the peripheral wall and is traversed by the passing apex seals.

While a two rotor spark ignition low compression engine may not require a center support bearing, the two rotor compression ignition engine structure described above and also other types such as a spark fired turbocharged rotary diesel and three or more rotor gasoline engines generally require center support(s) to prevent excessive crankshaft stress and deflection.

According to the present invention there is provided a split cylindrical carrier 70 whose split is on a plane containing the center line thereof and whose two halves 72 and 73 are held together at their respective flat interfaces 74 and 75 by four bolts 76 as best shown in FIGS. 2 – 7. The split carrier 70 has inner and outer concentric cylindrical surfaces 77 and 78 which are machined when the halves 72 and 73 are bolted together. The outer cylindrical surface 78 provides for mounting the carrier in the engine housing as described in more detail later while the inner cylindrical surface 77 is sized to receive a split main journal bearing shell 79 with a crush fit to accurately determine concentricity thereof. The two bearing shell halves 80 and 81 fit in the respective carrier halves 72 and 73 and have radially outwardly projecting tangs 82 at one edge as shown in FIG. 3 on shell half 80 that are received in runout slots cut in the respective carrier half in which it is mounted to provide axial location and also engage the edge of the other carrier half at the split line to prevent relative rotational movement of the bearing shells.

In addition, the split carrier 70 has an external tooth annular stationary phasing gear 83 that is formed integral therewith on one end thereof, the forming of these teeth also being accomplished when the carrier halves 72 and 73 are held together by bolts 76. To assure that there is very accurate bearing and gear tooth alignment, there is also provided a pair of hollow dowels 84 through which the two bolts 76 remote from the gear extend, these dowels being received with close fits in accommodating counterbores through the interfaces 74 and 75 of the carrier halves as shown in FIGS. 2 and 3. There is also provided for this purpose a pair of tongue and glove joints 85.

To assure that the gear tooth spacing across the split line is no different than between the other adjoining teeth after the bearing shell 79 is crush fit, small diametrically opposite radially extending reliefs 86 and 88 are machined in the interface 74 of carrier half 72 directly back of the gear teeth, i.e. between the gear teeth and the bolts. As a result, the clamping pressure provided by the bolts 76 is effectively applied or moved to the area of the interfaces 74 and 75 radially inward of the gear to provide for a tight joint at the split line of the gear teeth. In addition, the carrier clamping bolts nearest the gear teeth have chamfers 89 about their holes in the interface 74 of carrier half 72 as shown in FIG. 3 to minimize the possibility of carrier rocking action or separation when the carrier halves are bolted together.

In a further effort to eliminate gear tooth separation which might occur as a result of the crush fit of the split bearing shell 79, the end of the split bearing shell at the gear is set back relative to the outboard side thereof so as to not extend the full width of the gear joint as shown in FIGS. 1 and 3. As a result, the gear portion of the carrier does not contribute significantly to the bearing crush and therefore does not expand radially in reaction thereto. Furthermore, with this bearing setback, the main journal bearing force on the gear is also reduced.

In multi-rotor rotary engines arranged as described regardless of whether they are compression or spark ignition type, the gas pressure force on the rotors always acts in one general direction which is upward on the crankshaft as viewed in FIGS. 1 and 2. Thus, the intermediate main journal 36 need only be supported against this rotor gas pressure force on the upper side which is on the side of the major axis 47 opposite the combustion side where the fuel injectors are located.

To support the intermediate main journal 36 in the engine, the intermediate housing 14 is provided with a cylindrical opening 90 therethrough that is concentric with the end collar mounting arrangements 40 and 41 that locate the outboard main journals 34 and 35. The diameter of the intermediate housing opening 90 is determined to have a tight locating fit with the outer cylindrical surface 78 of the split carrier 70 and is slightly larger than that of the eccentrics 33 so that either of them can be passed therethrough in the assembly of the engine to thus permit installation of the one-piece crankshaft 31, the outer cylindrical surface 78 having a reduced radius portion 91 on the carrier half 73 to permit assembly of the carrier 70 in the engine as will now be described.

Figure 6:
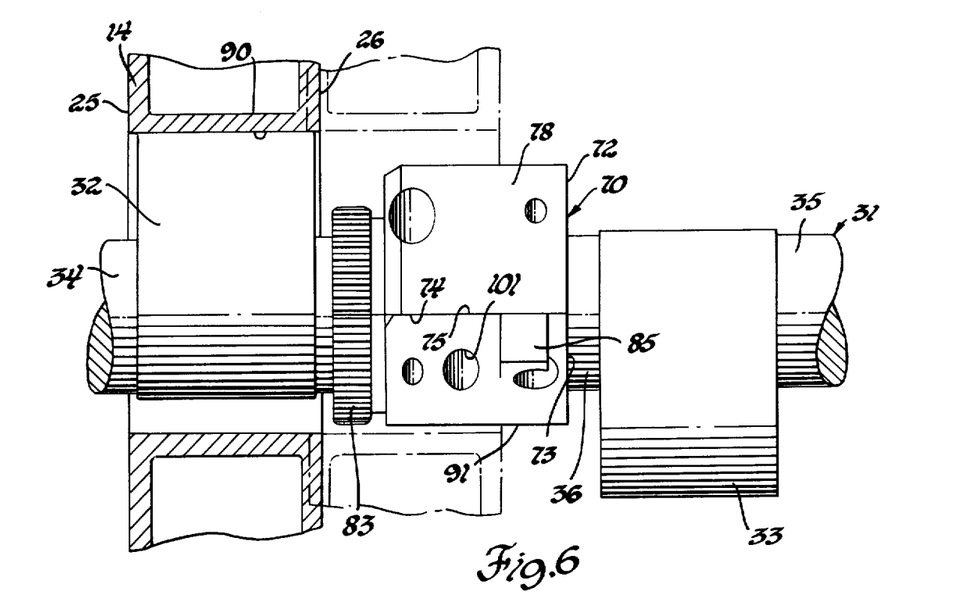
FIGS. 6 and 7 are enlarged views showing sequential steps in the installation of the assembled carrier, stationary phasing gear and bearing in the engine housing.
Figure 7:
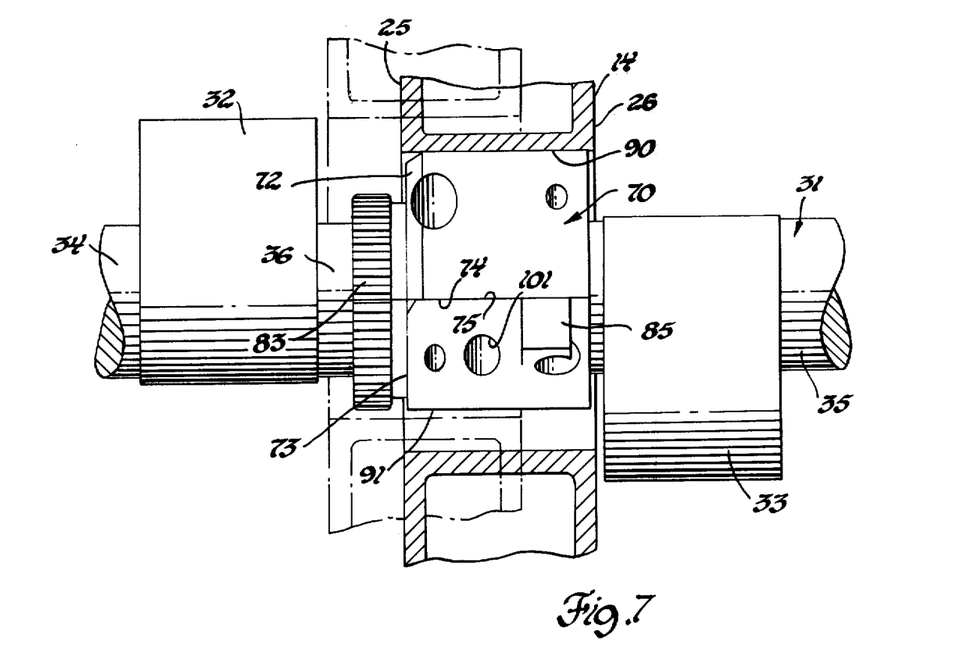

Referring to FIG. 6, the assembly of the crank-shaft intermediate bearing support parts is accomplished by locating one of the eccentrics such as 32 in the opening 90 in the intermediate housing 14 with the intermediate main journal 36 then located in the cavity 30 and the end housing 12 not yet in place. Using the same bolts 76 and dowels 84 used during the machining of the carrier 70, the carrier halves 72 and 74 are then bolted together with their bearing shells 80 and 81 about the intermediate main journal 36. Then the assembly is checked in this convenient location for phasing gear tooth closure at the split line and bearing clearance with the main journal. Thereafter the intermediate housing 14 is threaded over the eccentric 32 and located radially outward of the assembled carrier 70, FIGS. 6 and 7 showing sequential steps in the threading of these members wherein the relieved portion 91 provides the necessary clearance with the intermediate housing to accomplish this feat. With the assembled carrier 70 then located in the opening 90, it is angularly indexed so that its split line aligns with the major axis 47 of the rotor housing peripheral walls 20 and 21 and the outer cylindrical surface 78 is fully radially supported against the rotor gas pressure force by a portion of the wall of the housing opening 90.

The assembled carrier 70 is located and held in this position by a pair of parallel nesting dowels 94 and 96 which are received in holes 98 and 99 in the intermediate housing 14 at right angles to the major axis 47. The dowels 94 and 96 are located on opposite sides of and at equal distances from the minor axis 48 and at their inner ends are received in pockets 101 and 102 in the carrier half 73 and at their outer ends are engaged by a flexible beam 104 at equal distances from a mid point of this beam where it is secured by a bolt 106 to the intermediate housing 14. The beam 104 normally provides equal spring forces on the dowels 94 and 96 which are thus loaded in compression to hold the outer cylindrical surface 78 of the assembled carrier 70 in proper position against the wall of the mounting hole 90 to receive the combustion gas pressure force. Furthermore, the spring rate of the beam 104 is determined so that the beam will flex to permit the dowels 94 and 96 to move axially and thus permit slight angular movement of the assembled carrier 70 about its axis to dampen gear tooth shock loads.

While the split carrier with integral phasing gear and split bearing assembly and the mounting arrangement therefor according to the present invention have been illustrated in a two rotor arrangement, it will be understood that such an intermediate main journal support could be provided for any number of intermediate main journals and without the integral phasing gear. In that case, the spring loaded dowels continue to serve as holders and dampen any carrier motion caused by friction in the bearing.

The above described embodiment is illustrative of the invention which may be modified within the scope of the appended claims.

We claim:

1. A rotary combustion engine comprising housing means having at least two cavities with peripheral walls having a common major axis and a common minor axis, said housing means including an intermediate housing between one side of each cavity and outboard located housings on the other sides of said cavities, a one-piece crankshaft having an eccentric located in each said cavity, said crankshaft further having at least three main journals with one of said main journals located between said eccentrics and the other main journals located on the other sides of said eccentrics, bearing means rotatably supporting said crankshaft at each of said other main journals in said outboard located housings, a rotor rotatably mounted on each said eccentric, said rotors having concentrically arranged rotary phasing gears that rotate therewith with at least one of said rotary phasing gears on one of said rotors located adjacent said intermediate housing, an annular stationary phasing gear received about said crankshaft and secured to one of said outboard located housings and meshing with the other of said rotary phasing gears, and split carrier-bearing-gear means mounted about said crankshaft and between said eccentrics in said intermediate housing, said split carrier-bearing-gear means comprising an annular carrier with concentric inwardly and outwardly facing inner and outer cylindrical surfaces and an integral concentric stationary phasing gear at one end, said carrier being split into two halves along a longitudinal plane in which the center line of said carrier lies, a cylindrical bearing split into two halves along a longitudinal plane in which the center line of said bearing lies, each said bearing half mounted on the inner cylindrical surface of one of said carrier halves, said inner cylindrical surface sized to provide a crush fit on said bearing halves when said carrier halves are assembled, said intermediate housing having a cylindrical mounting hole sized to permit free passage of said eccentrics and provide a close fit with said outer cylindrical surface of said carrier halves, bolts for bolting said carrier halves together with said bearing halves in place about said one main journal while said one main journal is located to one side of said intermediate housing, said outer cylindrical surface of said carrier having a peripheraliy extending reduced radius portion on only one of said carrier halves to permit the assembled carrier halves to be inserted into said mounting hole and said integral stationary phasing gear brought into mesh with said one rotary phasing gear after one of said eccentrics has first been passed therethrough and said intermediate housing and said crankshaft are turned in a threaded manner relative to each other, and a pair of nesting dowels mounted in parallel guide holes in said intermediate housing at right angles to said major axis and in the direction of the major combustion gas pressure force transmitted by said rotor to said crankshaft, said nesting dowels at their inner ends received in pockets in said one carrier half located at equal distances from and on opposite sides of said minor axis, and means for engaging the outer ends of said nesting dowels so that said dowels are loaded in compression and locate the split of said carrier in line with said major axis and hold said outer cylindrical surface of said carrier on the other carrier half in position against the wall of said mounting hole in said intermediate housing to receive the combustion gas pressure force while permitting slight angular movement of said carrier and thus said integral stationary phasing gear to dampen gear tooth shock loading.

2. A rotary combustion engine comprising housing means having at least two cavities with peripheral walls having a common major axis and a common minor axis, said housing means including an intermediate housing between one side of each cavity and outboard located housings on the other sides of said cavities, a one-piece crankshaft having an eccentric located in each said cavity, said crankshaft further having at least three main journals with one of said main journals located between said eccentrics and the other main journals located on the other sides of said eccentrics, bearing means rotatably supporting said crankshaft at each of said other main journals in said outboard located housings, a rotor rotatably mounted on each said eccentric, said rotors having concentrically arranged rotary phasing gears that rotate therewith with at least one of said rotary phasing gears on one of said rotors located adjacent said intermediate housing, an annular stationary phasing gear received about said crankshaft and secured to one of said outboard located housings and meshing with the other of said rotary phasing gears, and split carrier-bearing-gear means mounted about said crankshaft and between said eccentrics in said intermediate housing, said split carrier-bearing-gear means comprising an annular carrier with concentric inwardly and outwardly facing inner and outer cylindrical surfaces and an integral concentric stationary phasing gear at one end, said carrier being split into two halves along a longitudinal plane in which the center line of said carrier lies, a cylindrical bearing split into two halves along a longitudinal plane in which the center line of said bearing lies, each said bearing half mounted on the inner cylindrical surface of one of said carrier halves, said inner cylindrical surface sized to provide a crush fit on said bearing halves when said carrier halves are assembled, said intermediate housing having a cylindrical mounting hole sized to permit free passage of said eccentrics and provide a close fit with said outer cylindrical surface of said carrier halves, bolts for bolting said carrier halves together with said bearing halves in place about said one main journal while said one main journal is located to one side of said intermediate housing, said outer cylindrical surface of said carrier having a peripherally extending reduced radius portion on only one of said carrier halves to permit the assembled carrier halves to be inserted into said mounting hole and said integral stationary phasing gear brought into mesh with said one rotary phasing gear after one of said eccentrics has first been passed therethrough and said intermediate housing and said crankshaft are turned in a threaded manner relative to each other, and a pair of nesting dowels mounted in parallel guide holes in said intermediate housing at right angles to said major axis and in the direction of the major combustion gas pressure force transmitted by said rotor to said crankshaft, said nesting dowels at their inner ends received in pockets in said one carrier half located at equal distances from and on opposite sides of said minor axis, and spring means for engaging the outer ends of said nesting dowels so that said dowels are loaded in compression and locate the split of said carrier in line with said major axis and hold said outer cylindrical surface of said carrier on the other carrier half in position against the wall of said mounting hole in said intermediate housing to receive the combustion gas pressure force while permitting slight angular movement of said carrier and thus said integral stationary phasing gear to dampen gear tooth shock loading.

3. A rotary combustion engine comprising housing means having at least two cavities with peripheral walls having a common major axis and a common minor axis, said housing means including an intermediate housing between one side of each cavity and outboard located housings on the other sides of said cavities, a one-piece crankshaft having an eccentric located in each said cavity, said crankshaft further having at least three main journals with one of said main journals located between said eccentrics and the other main journals located on the other sides of said eccentrics, bearing means rotatably supporting said crankshaft at each of said other main journals in said outboard located housings, a rotor rotatably mounted on each said eccentric, said rotors having concentrically arranged rotary phasing gears that rotate therewith with at least one of said rotary phasing gears on one of said rotors located adjacent said intermediate housing, an annular stationary phasing gear received about said crankshaft and secured to one of said outboard located housings and meshing with the other of said rotary phasing gears, and split carrier-bearing-gear means mounted about said crankshaft and between said eccentrics in said intermediate housing, said split carrier-bearing-gear means comprising an annular carrier with concentric inwardly and outwardly facing inner and outer cylindrical surfaces and an integral concentric stationary phasing gear at one end, said carrier being split into two halves with interfaces on a longitudinal plane in which the center line of said carrier lies, a cylindrical bearing split into two halves along a longitudinal plane in which the center line of said bearing lies, each said bearing half mounted on the inner cylindrical surface of one of said carrier halves, said inner cylindrical surface of one of said carrier halves, said inner cylindrical surface sized to provide a crush fit on said bearing halves when said carrier halves are assembled, said intermediate housing having a cylindrical mounting hole sized to permit free passage of said eccentrics and provide a close fit with said outer cylindrical surface of said carrier halves, bolts through the mating interfaces for bolting said carrier halves together with said bearing halves in place about said one main journal while said one main journal is located to one side of said intermediate housing, one of said interfaces having radial reliefs axially located between the gear teeth and said bolts so that the bolt clamping load is positively transmitted to clamp the gear halves, a hollow dowel received about at least two of said bolts and received in counterbores in the mating interfaces to assure accurate mating of said carrier halves, said outer cylindrical surface of said carrier having a peripherally extending reduced radius portion on only one of said carrier halves to permit the assembled carrier halves to be inserted into said mounting hole and said integral stationary phasing gear brought into mesh with said one rotary phasing gear after one of said eccentrics has first been passed therethrough and said intermediate housing and said crankshaft are turned in a threaded manner relative to each other, and a pair of nesting dowels mounted in parallel guide holes in said intermediate housing at right angles to said major axis and in the direction of the combustion gas pressure force transmitted by said rotor to said crankshaft, said nesting dowels at their inner ends received in pockets in said one carrier half located at equal distances from and on opposite sides of said minor axis, and a flexible beam secured at a mid position to said intermediate housing and engaging on opposite sides thereof with the outer ends of said nesting dowels so that said dowels are loaded in compression and locate the split of said carrier in line with said major axis and hold said outer cylindrical surface of said carrier on the other carrier half in position against the wall of said mounting hole in said intermediate housing to receive the combustion gas pressure force while permitting slight angular movement of said carrier and thus said integral stationary phasing gear to dampen gear tooth shock loading.

4. A rotary combustion engine comprising housing means having at least two cavities with peripheral walls having a common major axis and a common minor axis, said housing means including an intermediate housing between one side of each cavity and outboard located housings on the other sides of said cavities, a one-piece crankshaft having an eccentric located in each said cavity, said crankshaft further having at least three main journals with one of said main journals located between said eccentrics and the other main journals located on the other sides of said eccentrics, bearing means rotatably supporting said crankshaft at each of said other main journals in said outboard located housings, a rotor rotatably mounted on each said eccentric, said rotors having concentrically arranged rotary phasing gears that rotate therewith, an annular stationary phasing gear received about said crankshaft and secured to one of said housings and meshing with each of said rotary phasing gears, and split carrier-bearing means mounted about said crankshaft and between said eccentrics in said intermediate housing, said split carrier-bearing means comprising an annular carrier with concentric inwardly and outwardly facing inner and outer cylindrical surfaces, said carrier being split into two halves along a longitudinal plane in which the center line of said carrier lies, a cylindrical bearing split into two halves along a longitudinal plane in which the center line of said bearing lies, each said bearing half mounted on the inner cylindrical surface of one of said carrier halves, said inner cylindrical surface sized to provide a crush fit on said bearing halves when said carrier halves are assembled, said intermediate housing having a cylindrical mounting hole sized to permit free passage of said eccentrics and provide a close fit with said outer cylindrical surface of said carrier halves, bolts for bolting said carrier halves together with said bearing halves in place about said one main journal while said one main journal is located to one side of said intermediate housing, said outer cylindrical surface of said carrier having a peripherally extending reduced radius portion on only one of said carrier halves to permit the assembled carrier halves to be inserted into said mounting hole after one of said eccentrics has first been passed therethrough and said intermediate housing and said crankshaft are turned in a threaded manner relative to each other, and a pair of nesting dowels mounted in parallel guide holes in said intermediate housing at right angles to said major axis and in the direction of the major combustion gas pressure force transmitted by said rotor to said crankshaft, said nesting dowels at their inner ends received in pockets in said one carrier half located at equal distances from and on opposite sides of said minor axis, and means for engaging the outer ends of said nesting dowels so that said dowels are loaded in compression and locate the split of said carrier in line with said major axis and hold said outer cylindrical surface of said carrier on the other carrier half in position against the wall of said mounting hole in said intermediate housing to receive the combustion gas pressure force and dampen any angular movement of said carrier.

5. A rotary combustion engine comprising housing means having at least two cavities with peripheral walls having a common major axis and a common minor axis, said housing means including an intermediate housing between one side of each cavity and outboard located housings on the other sides of said cavities, a one-piece crankshaft having an eccentric located in each said cavity, said crankshaft further having at least three main journals with one of said main journals located between said eccentrics and the other main journals located on the other sides of said eccentrics, bearing means rotatably supporting said crankshaft at each of said other main journals in said outboard located housings, a rotor rotatably mounted on each said eccentric, said rotors having concentrically arranged rotary phasing gears that rotate therewith, an annular stationary phasing gear received about said crankshaft and secured to one of said housings and meshing with each of said rotary phasing gears, and split carrier-bearing means mounted about said crankshaft and between said eccentrics in said intermediate housing, said split carrier-bearing means comprising an annular carrier with concentric inwardly and outwardly facing inner and outer cylindrical surfaces, said carrier being split into two halves along a longitudinal plane in which the center line of said carrier lies, a cylindrical bearing split into two halves along a longitudinal plane in which the center line of said bearing lies, each said bearing half mounted on the inner cylindrical surface of one of said carrier halves, said inner cylindrical surface sized to provide a crush fit on said bearing halves when said carrier halves are assembled, said intermediate housing having a cylindrical mounting hole sized to permit free passage of said eccentrics and provide a close fit with said outer cylindrical surface of said carrier halves, bolts for bolting said carrier halves together with said bearing halves in place about said one main journal while said one main journal is located to one side of said intermediate housing, said outer cylindrical surface of said carrier having a peripherally extending reduced radius portion on only one of said carrier halves to permit the assembled carrier halves to be inserted into said mounting hole after one of said eccentrics has first been passed therethrough and said intermediate housing and said crankshaft are turned in a threaded manner relative to each other, and a pair of nesting dowels mounted in parallel guide holes in said intermediate housing at right angles to said major axis and in the direction of the major combustion gas pressure force transmitted by said rotor to said crankshaft, said nesting dowels at their inner ends received in pockets in said one carrier half located at equal distances from and on opposite sides of said minor axis, and spring means for engaging the outer ends of said nesting dowels so that said dowels are loaded in compression and locate the split of said carrier in line with said major axis and hold said outer cylindrical surface of said carrier on the other carrier half in position against the wall of said mounting hole in said intermediate housing to receive the combustion gas pressure force and dampen any angular movement of said carrier.

6. A rotary combustion engine comprising housing means having at least two cavities with peripheral walls having a common major axis and a common minor axis, said housing means including an intermediate housing between one side of each cavity and outboard located housings on the other sides of said cavities, a one-piece crankshaft having an eccentric located in each said cavity, said crankshaft further having at least three main journals with one of said main journals located between said eccentrics and the other main journals located on the other sides of said eccentrics, bearing means rotatably supporting said crankshaft at each of said other main journals in said outboard located housings, a rotor rotatably mounted on each said eccentric, said rotors having concentrically arranged rotary phasing gears that rotate therewith with at least one of said rotary phasing gears on one of said rotors located adjacent said intermediate housing, an annular stationary phasing gear received about said crankshaft and secured to one of said housings and meshing with each of said rotary phasing gears, and split carrier-bearing means mounted about said crankshaft and between said eccentrics in said intermediate housing, said split carrier-bearing means comprising an annular carrier with concentric inwardly and outwardly facing inner and outer cylindrical surfaces, said carrier being split into two halves with interfaces on a longitudinal plane in which the center line of said carrier lies, a cylindrical bearing split into two halves along a longitudinal plane in which the center line of said bearing lies, each said bearing half mounted on the inner cylindrical surface of one of said carrier halves, said inner cylindrical surface sized to provide a crush fit on said bearing halves when said carrier halves are assembled, said intermediate housing having a cylindrical mounting hole sized to permit free passage of said eccentrics and provide a close fit with said outer cylindrical surface of said carrier halves, bolts through the mating interfaces for bolting said carrier halves together with said bearing halves in place about said one main journal while said one main journal is located to one side of said intermediate housing, a hollow dowel received about at least two of said bolts and received in counterbores in the mating interfaces to assure accurate mating of said carrier halves, said outer cylindrical surface of said carrier having a peripherally extending reduced radius portion on only one of said carrier halves to permit the assembled carrier halves to be inserted into said mounting hole, after one of said eccentrics has first been passed therethrough and said intermediate housing and said crankshaft are turned in a threaded manner relative to each other, and a pair of nesting dowels mounted in parallel guide holes in said intermediate housing at right angles to said major axis and in the direction of the combustion gas pressure force transmitted by said rotor to said crankshaft, said nesting dowels at their inner ends received in pockets in said one carrier half located at equal distances from and on opposite sides of said minor axis, and a flexible beam secured at a mid position to said intermediate housing and engaging on opposite sides thereof with the outer ends of said nesting dowels so that said dowels are loaded in compression and locate the split of said carrier in line with said major axis and hold said outer cylindrical surface of said carrier on the other carrier half in position against the wall of said mounting hole in said intermediate housing to receive the combustion gas pressure force and dampen any angular movement of said carrier.

* * * * *

UNITED STATES PATENT AND TRADEMARK OFFICE
CERTIFICATE OF CORRECTION

PATENT NO. : 3,903,847

DATED : September 9, 1975

INVENTOR(S) : Richard T. Olenzek, Herman H. Petrak, Carl S. Hoffman, Paul J. Louzecky It is certified that error appears in the above-identified patent and that said Letters Patent are hereby corrected as shown below:

Column 3, line 45, "so" should read numeral -- 50 --.
Column 8, lines 44, 45, delete "of one of said carrier halves, said inner cylindrical surface".

Signed and Sealed this eleventh Day of May 1976

[SEAL]

Attest:

RUTH C. MASON
Attesting Officer

C. MARSHALL DANN
Commissioner of Patents and Trademarks